United States Patent [19]

Nisper

[11] 4,130,288
[45] Dec. 19, 1978

[54] PISTON RING
[75] Inventor: Kenneth J. Nisper, Spring Lake, Mich.
[73] Assignee: Questor Corporation, Toledo, Ohio
[21] Appl. No.: 789,022
[22] Filed: Apr. 20, 1977
[51] Int. Cl.² .................................................. F16J 9/06
[52] U.S. Cl. .................................................. 277/216
[58] Field of Search ................ 277/216, 138, 139, 146
[56] References Cited
U.S. PATENT DOCUMENTS
3,261,612  7/1966  Games ................................. 277/139
3,695,622  10/1972  Davis et al. ........................ 277/139

Primary Examiner—Robert I. Smith
Attorney, Agent, or Firm—Harry O. Ernsberger

[57] ABSTRACT

The disclosure embraces a piston ring particularly an oil control ring comprising a spacer-expander ring in association with one or more rails, ring segments or sealing rings wherein the spacer-expander ring component is configurated for preventing or minimizing necklacing during installation of the ring construction in the ring groove of a piston.

6 Claims, 7 Drawing Figures

PISTON RING

The invention relates to piston rings and more especially to an oil control ring construction embodying a spacer-expander ring configured to prevent or minimize necklacing of the rails or ring segments during installation of the ring construction in the ring groove of a piston. The ring construction of the invention comprises ring segments or rails fashioned of thin metal strip or ribbon and spacer-expanders formed from thin metal strip or ribbon.

Necklacing is a condition that obtains when a ring construction in a free state is initially installed in a ring groove in a piston wherein the ring construction is pushed to the bottom of the ring groove on one side of the piston and the inside diameter of the rails or spacer-expander extends outside of the groove on the opposite side.

In installing a three-piece oil ring construction involving two rails and an expander, should the inside diameter of a rail at one side of the piston extend outside of the groove, and rail being flexible can slide relative to the spacer-expander and cannot enter the piston groove when the piston is inserted in the cylinder bore. Necklacing or excessive necklacing may prevent the ring construction from being properly installed in a piston groove.

Certain types of circumferential spacer-expander ring have been used configured with inner and outer crowns wherein the inwardly extending crowns are formed with dimples which tend to avoid excessive necklacing by preventing the ring construction from moving into the groove in the piston to the full depth to which it would otherwise move if the dimples were not present. An arrangement of this character for limiting the ability of a ring construction to move into the ring groove to limit the necklacing effect is illustrated in U.S. patent to Hamm No. 2,910,334.

The present invention embraces the provision of a piston ring construction embodying a circumferential spacer-expander of generally U-shaped cross section associated with rails or ring segments wherein rail-engaging abutments connecting inwardly extending leg portions of the spacer-expander are fashioned at corner regions with inwardly extending protrusions to eliminate excessive inward movement of the spacer-expander in the piston groove and thereby reduce the tendency of necklacing in assembling the ring construction in the ring groove of a piston.

An object of the invention resides in a piston ring construction embodying a circumferential spacer-expander and ring rails or ring segments wherein the spacer-expander is fashioned of thin sheet metal into U-shaped formation having radially inwardly extending leg portions integrally connected at their inner ends by bridge portions or connectors, the bridge portions providing abutments for the rails or ring segments wherein one or more corner regions of the abutments are configurated with protrusions which extend radially inwardly to an extent preventing or tending to prevent necklacing, and wherein such arrangement does not affect the flexibility of the ring construction or reduce the ability of the rails or ring segments to adapt to the cylinder wall and form an effective seal therewith.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

Figure 1:
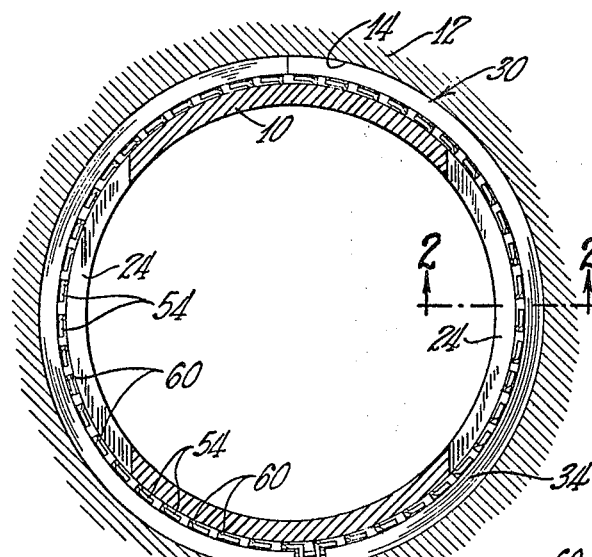
FIG. 1 is a transverse sectional view through a piston and a portion of the cylinder at the oil control ring groove of the piston illustrating a ring construction of the invention in a ring groove.
Figure 2:
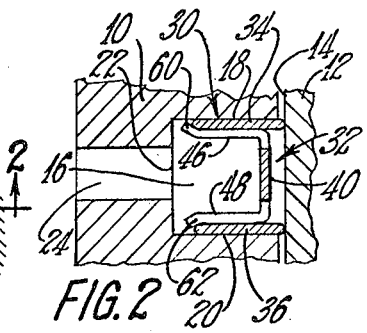
FIG. 2 is a greatly enlarged fragmentary sectional view taken substantially on the line 2—2 of FIG. 1.

Referring to the drawings and initially to FIGS. 1 and 2, there is illustrated in cross section a cylindrical skirt portion of a reciprocating engine piston 10 and a portion of a cylinder 12 having a cylindrical bore 14 accommodating the reciprocating piston 10. The piston is equipped with conventional compression rings (not shown) disposed in grooves in the piston.

The piston 10 is fashioned with a circumferential ring groove 16 accommodating the oil control ring construction of the invention. The ring groove 16 is defined by an upper wall 18, a lower wall 20, and a cylindrical back or bottom wall 22. Oil drainage or vent openings 24 extend from the bottom wall 22 of the groove 16 to the interior of the skirt of the piston 10 for accommodating flow of oil from the ring groove 16 to the interior of the piston. In the embodiment illustrated, the upper wall 18 and the lower wall 20 of the groove 16 are in parallel relation.

Figure 3:
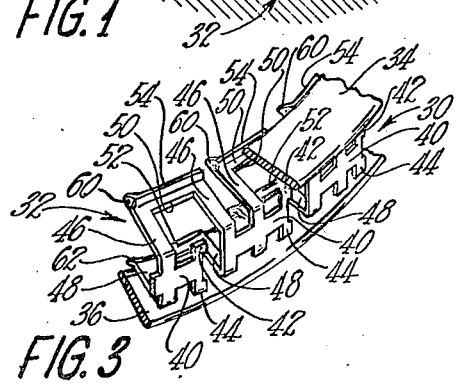
FIG. 3 is an enlarged fragmentary perspective view of the spacer-expander ring construction and rails associated therewith.
Figure 5:
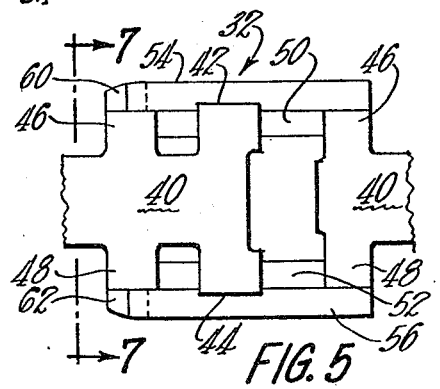
FIG. 5 is an elevational view of a portion of the spacer-expander shown in FIG. 3.
Figure 6:
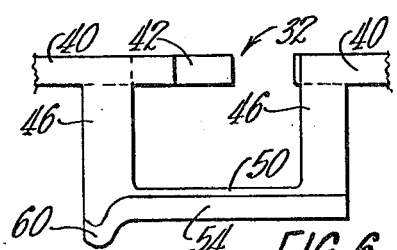
FIG. 6 is a top view of the construction shown in FIG. 5.

In the embodiment illustrated, the oil control ring construction or assembly 30 comprises a parted spacer-expander ring or ring construction 32, a first parted rail, sealing ring or ring segment 34 and a second parted rail, sealing ring or ring segment 36. The inner and outer circumferential edges of the rails 34 and 36 may be slightly rounded as illustrated in FIGS. 2 and 3. The outer circumferential edges of the rails 34 and 36 are in sealing engagement with the surface of bore 14 of the cylinder.

The spacer-expander ring 32 and the rails 34 and 36 are fashioned of thin flat steel as is employed in conventional ring constructions. The spacer-expander ring or ring construction 32 functions to space the rails 34 and 36 axially of the piston and to bias the rails into sealing engagement with the cylindrical surface of bore 14. The ring 32 is provided with radially inwardly extending means or protrusions so as to prevent the ring 32 from moving into the piston groove 16 to the full depth to which it would otherwise move resulting in necklacing.

The protrusions serve to increase the effective radial depth of the spacer-expander ring 32 without increasing the radial depth of the portion of the spacer-expander which controls the character and functioning of the rails, sealing rings or ring segments.

Figure 4:
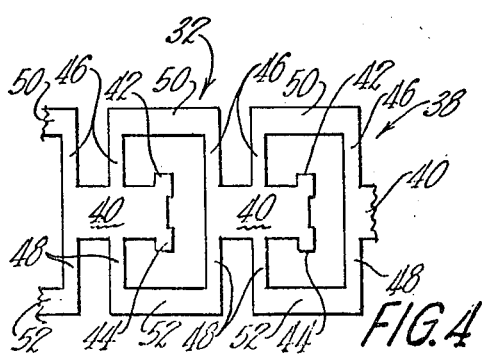
FIG. 4 is a fragmentary portion of a flat pattern of the blank for forming the spacer-expander of the ring construction.

The spacer-expander ring 32 is fashioned or formed from a comparatively thin blank or strip 38 of metal, such as steel, FIG. 4 illustrating the stamped blank 38 in planar form before portions are bent or shaped to provide the spacer-expander ring 32 of the configuration shown in FIGS. 2, 3 and 5 through 7. The spacer-expander ring 32 is fashioned with outer circumferentially-spaced body portions or sections 40 which are interconnected as an integral construction or unit in a manner herein described.

The body portions 40 are provided with upwardly extending struts 42 which engage the upper rail 34, and downwardly extending struts 44 which engage the lower rail 36. The spacer-expander 32 is formed with upper radially inwardly extending legs or sections 46 and lower radially inwardly extending legs or sections 48. The inwardly extending portions or sections 46 and 48 are in parallel relation as indicated in FIGS. 2, 3 and 7.

The inner extremities of the pairs of inwardly extending upper legs or portions 46 are integrally joined by connecting or bridge portions 50, and the inner extremities of the pairs of inwardly extending lower legs or portions 48 are integrally joined by connecting portions or bridges 52. The upper bridge portions 50 are formed or bent upwardly providing abutments or ledges 54 which abut or engage the inner circumferential edge of the upper rail 34.

Figure 7:
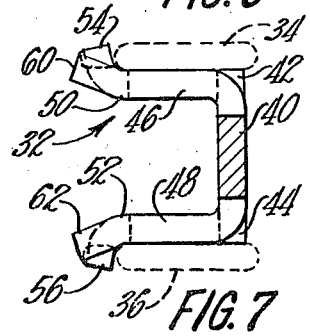
FIG. 7 is a sectional view taken substantially on the line 7—7 of FIG. 5.

The lower bridge portions 52 are formed or bent downwardly providing abutments or ledges 56 which abut or engage the inner circumferential edge of the lower rail 36 in the manner illustrated in FIGS. 2, 3 and 7, the rails 34 and 36 being shown in broken lines in FIG. 7. The spacer-expander through the abutments 54 and 56 bias the rails or ring segments 34 and 36 into sealing engagement with the cylinder wall.

In order to prevent, reduce or minimize the tendency of necklacing, a portion of each of the upper abutments 54 preferably at a corner region adjacent its juncture with an inwardly extending leg portion 46 is configurated, swaged, stamped or shaped with a radially inwardly extending protrusion, projection or ear 60, and a portion of each of the lower abutments 56 preferably at a corner region adjacent its juncture with an inwardly extending leg portion 48 is configurated, swaged, stamped or shaped with a radially inwardly extending protrusion, projection or ear 62. The protrusions, projections or ears 60 and 62 extend only a few thousandths of an inch inwardly of the inner edges of the abutments 54 and 56.

The upper inwardly radially extending legs or portions 46, as well as the struts 42, engage the upper rail 34, and the lower inwardly radially extending legs or portions 48, as well as the struts 44, engage the lower rail 36. The upper and lower inwardly extending portions 46 and 48 and the struts 42 and 44 are dimensioned so that the upper and lower rails 34 and 36 are freely disposed in the piston ring groove 16 so that the spacer-expander 32 is effective to bias the rails into sealing engagement with the cylinder wall.

The protrusions or projections 60 and 62 prevent the spacer-expander ring 32 from moving into the piston groove to the full depth to which it would otherwise move in the absence of the protrusions or projections. The protrusions 60 and 62 increase the effective radial depth of the spacer-expander ring without increasing the radial depth of the portions of the spacer-expander ring which control the proper functioning of the piston ring. By restricting the inward movement of the spacer-expander ring 32 into the ring groove 16, the tendency for necklacing effect of the ring construction is greatly reduced or eliminated which arrangement promotes or facilitates installation of the ring construction in a piston groove in a minimum of time.

While the embodiment shown in the drawings provides an inwardly extending protrusion or projection on one end of each of the abutments 54 and 56, it is to be understood that protrusions or projections may be provided on the other ends of the abutments 54 and 56, or a protrusion or projection may be provided at an intermediate region of an abutment. However, as illustrated in FIG. 3, adjacent pairs of radially inwardly extending legs, sections or portions 46 are closely spaced, and it is found that protrusions or projections on one end only of each of the abutments 54 and 56 are effective to prevent or minimize the tendency for necklacing.

It is apparent that, within the scope of the invention, modifications and different arrangements may be made other than as herein disclosed, and the present disclosure is illustrative merely, the invention comprehending all variations thereof.

I claim:

1. In a rail supporting member for a piston ring, said rail supporting member comprising a plurality of circumferentially-arranged body sections, an upper row and a lower row of radially inwardly extending leg portions integrally connected with the body sections, said radially inwardly extending leg portions of each row being arranged for engagement with individual rail members, and an upper row and a lower row of bridge portions connecting the inner ends of pairs of the inwardly extending leg portions, said bridge portions providing abutments for engaging the inner edges of the rails members, the bridge portions of each row being provided with radially inwardly extending swaged protrusions for spacing the rail supporting members from the bottom of the ring groove in the piston to minimize the tendency of necklacing.

2. The rail supporting member according to claim 1 wherein each of the body sections is provided with strut portions for engagement with each of the rail members.

3. The rail supporting member according to claim 1 wherein one end region of each bridge portion adjacent its juncture with an inwardly extending leg portion is formed with a radially inwardly extending swaged protrusion.

4. In a piston ring construction having a spacer-expander member for engagement with upper and lower rail members, said spacer-expander member comprising a plurality of circumferentially-arranged body sections, radially inwardly extending leg portions arranged in upper and lower rows integrally connected with the body sections, said body sections having strut portions for engagement with the rail members, each row of radially inwardly extending leg portions arranged for engagement with one of the rail members, bridge portions connecting the inner ends of pairs of leg portions of the upper row, bridge portions connecting the inner ends of pairs of leg portions of the lower row, said bridge portions providing abutments for engagement with the inner edges of the rail members, and an end region of each of the bridge portions of one row having a radially inwardly extending swaged protrusion for spacing the said spacer-expander member from the bottom of its ring groove to minimize the tendency of necklacing.

5. The spacer-expander according to claim 4 wherein an end region of each of the bridge portions of the other row has a radially inwardly extending swaged protrusion.

6. In a rail supporting spacer-expander for a piston ring, said spacer-expander comprising a plurality of circumferentially-arranged body sections, an upper row and a lower row of radially inwardly extending leg portions integrally connected with the body sections, the rows of radially inwardly extending leg portions arranged for engaging rail members, each of said body sections provided with upper and lower strut portions for engagement with the rail members, bridge portions connecting the pairs of inwardly extending leg portions of the upper row, bridge portions connecting the pairs of inwardly extending leg portions of the lower row, said bridge portions providing abutments engaging the inner edges of the rail members, and an end region of each of the bridge portions adjacent its connection with an inwardly extending leg portion having a radially inwardly extending swaged protrusion for spacing said spacer-expander member from the bottom of its ring groove to minimize the tendency of necklacing.

* * * * *